US012803807B2

(12) United States Patent
Bornheimer

(10) Patent No.: US 12,803,807 B2
(45) Date of Patent: Nov. 17, 2026

(54) METHODS AND SYSTEM TO AUTHENTICATE CLIENT-SIDE TRANSMISSION ACCESS

(71) Applicant: SOFTWARE AUTOMATION HOLDINGS, LLC, Bridgewater, NJ (US)

(72) Inventor: Zachary Bornheimer, Tampa, FL (US)

(73) Assignee: Software Automation Holdings, LLC, Bridgewater, NJ (US)

( * ) Notice: Subject to any disclaimer, the term of this patent is extended or adjusted under 35 U.S.C. 154(b) by 79 days.

(21) Appl. No.: 19/187,353

(22) Filed: Apr. 23, 2025

(65) Prior Publication Data

US 2025/0330319 A1 Oct. 23, 2025

Related U.S. Application Data

(60) Provisional application No. 63/637,559, filed on Apr. 23, 2024.

(51) Int. Cl.
*H04L 9/32* (2006.01)
*H04L 9/08* (2006.01)

(52) U.S. Cl.
CPC ............ *H04L 9/321* (2013.01); *H04L 9/0861* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 9,331,856 | B1 * | 5/2016 | Song | G06F 21/36 |
| 11,829,952 | B1 * | 11/2023 | Hoehnen | G06Q 10/0631 |
| 2019/0215374 | A1 * | 7/2019 | Ragsdale | H04L 67/55 |
| 2019/0332691 | A1 * | 10/2019 | Beadles | G06Q 20/3829 |
| 2021/0184842 | A1 * | 6/2021 | Nix | H04L 9/006 |
| 2023/0104852 | A1 * | 4/2023 | Dickie | H04L 63/062 726/26 |
| 2025/0119275 | A1 * | 4/2025 | Stockmann | H04L 9/3247 |

OTHER PUBLICATIONS

International Search Report dated Jul. 16, 2025 issued in corresponding application PCT/US2025/025948.

* cited by examiner

*Primary Examiner* — Sakinah White-Taylor
(74) *Attorney, Agent, or Firm* — Millen, White, Zelano & Branigan P.C.; William F. Nixon

(57) ABSTRACT

A method for authenticating a client-side device to access a private network is disclosed. The method also includes generating a derived key from a data file at a hosting server using a value of a time variable. The method also includes determining a session identification. The method also includes capturing information for variable metadata. The method also includes retrieving an API key. The method also includes encrypting the derived key, the session identification, the variable metadata, and the public API key into an encrypted validation object. The method also includes generating a request for authentication onto the private network having the encrypted validation object. The method also includes sending the request to a processing server. The method also includes comparing the encrypted validation object to the data file at the hosting server. The method also includes determining whether authentication is allowed based on the comparison.

20 Claims, 4 Drawing Sheets

METHODS AND SYSTEM TO AUTHENTICATE CLIENT-SIDE TRANSMISSION ACCESS

FIELD OF THE INVENTION

The present invention relates to a computer platform and associated methods for authenticating client-side transmission access to a client-side device to a private network.

DESCRIPTION OF THE RELATED ART

Service provider companies, such as an insurance company, does not want to provide an application programming interface (API) key for any client-side transmissions to their networks or servers because the key can be compromised. Possession of the API key would make the endpoint vulnerable to exploitation. Thus, most companies implement server-to-server communication. This entire process, however, takes place on the client-side technology stack. Further, it uses many different authentication processes, such as passwords, codes, and the like.

SUMMARY OF THE INVENTION

A method for authenticating a client-side device to access a private network is disclosed. The method includes determining a time variable having a value. The method also includes generating a derived key from a data file at a hosting server using the value of the time variable. The method also includes determining a session identification. The method also includes capturing information for variable metadata. The method also includes retrieving a public application programming interface (API) key. The method also includes encrypting the derived key, the session identification, the variable metadata, and the public API key into an encrypted validation object. The method also includes generating a request for authentication onto the private network having the encrypted validation object. The method also includes sending the request to a processing server. The method also includes performing a process at the processing server to compare the encrypted validation object to the data file at the hosting server. The method also includes notifying whether authentication is allowed or not from the processing server and enacting any security protocols to hinder automated attacks.

A method for authenticating a client-side device to submit data to a processing server is disclosed. The method includes determining a time variable having a value. The method also includes generating a derived key from a data file at a hosting server using the value of the time variable. The method also includes determining a session identification. The method also includes capturing information for variable metadata. The method also includes retrieving a publication application interface (API) key. The method also includes encrypting the derived key, the session identification, the variable metadata, and the public API key into an encrypted validation object. The method also includes generating a request for authentication onto the private network having the encrypted validation object. The method also includes sending the request to a processing server. The method also includes performing a process at the processing server to compare the encrypted validation object to the data file at the hosting server. The method also includes notifying whether authentication is allowed or not from the processing server and enacting any security protocols to hinder automated attacks.

A method for authenticating a client-side device to submit data to a processing server using a time-based algorithm referring to a trusted server as an alternative to a client-side device two-factor authentication is disclosed.

A method for authenticating a client-side device to access a private network is disclosed. The method includes determining a time variable having a value. The method also includes generating a derived key from a data file at a hosting server using the value of the time variable. The method also includes determining a session identification. The method also includes capturing information for variable metadata. The method also includes retrieving an application programming interface (API) key. The method also includes encrypting the derived key, the session identification, the variable metadata, and the API key into an encrypted validation object. The method also includes generating a request for authentication onto the private network having the encrypted validation object. The method also includes sending the request to a processing server. The method also includes comparing the encrypted validation object to the data file at the hosting server. The method also includes determining whether authentication is allowed based on the comparison.

A method for authenticating a client-side device to submit data is disclosed. The method includes generating a derived key from a data file at a hosting server using a time variable. The method also includes determining a session identification. The method also includes capturing information variable metadata. The method also includes retrieving a public application programming interface (API) key. The method also includes encrypting the derived key, the session identification, the variable metadata, and the public API key into an encrypted validation object. The method also includes generating a request for authentication onto the private network having the encrypted validation object. The method also includes sending the request to a processing server. The method also includes determining whether authentication is allowed based on the request.

A method for authenticating a client-side device is disclosed. The method includes encrypting a derived key, a session identification, variable metadata, and an application programming interface (API) key into an encrypted validation object. The method also includes sending a request for authentication onto a private network having the encrypted validation object to a processing server. The method also includes determining whether authentication onto the private network is allowed based on the request.

BRIEF DESCRIPTION OF THE DRAWINGS

Various other features and attendant advantages of the present invention will be more fully appreciated as the same becomes better understood when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments create an algorithmic alternative to using a password-like API key for authentication. The client-side technology is primary for allowable transmission and good-actor transmission. The disclosed system may implement three points of contact, as opposed to two. One point of contact may be the service provider's server, also known as a trusted server. Another point of contact may be the client-side device performing the request. The other point of contact may be the hosting server, which also serves as a trusted source in the disclosed system. Because of the three points of contact, the disclosed embodiments create a solution integrating principals of time-based authentication, complex obfuscation, an algorithm, and a static, or non-private, API key.

Figure 1:
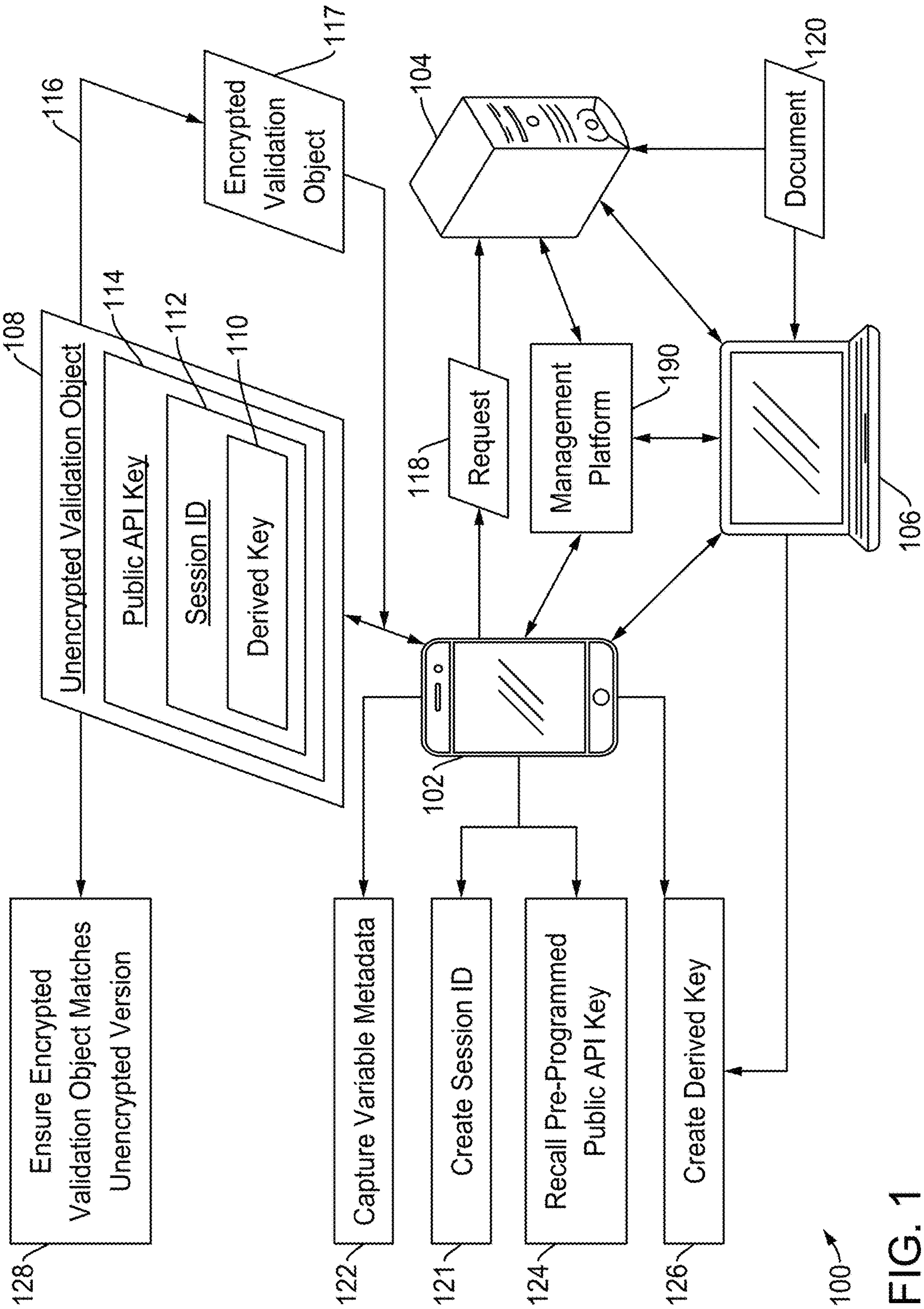
FIG. 1 illustrates a system for performing authentication according to the disclosed embodiments.

FIG. 1 depicts a system 100 for performing authentication according to the disclosed embodiments. System 100 may authenticate client-side device 102 that is to be authenticated to access a service provider network or server. To do, client-side device 102 interacts with hosting server 106 and processing server 104. Hosting server 106 may be a website hosting server that serves as a trusted source within system 100. Client-side device 102 may generate and use a validation object 108 to authenticate itself to processing server 104.

Client-side device 102 may generate unencrypted validation object 108 using a derived key 110, a session identification (id) 112, and a public API key 114. These features are disclosed in greater detail below. These pieces of information may be encrypted using encryption algorithm 116 to create encrypted validation object 117. Client-side device 102 provides request 118 to processing server 104. Request 118 may include unencrypted validation object 108 and encrypted validation object 117. Processing server 104 performs operations using these features to authenticate client-side device 102. Both client-side device 102 and processing server 104 interact with hosting server 106. Hosting server 106 may store document, or file, 120 that also is used in generating derived key 110 and authentication by processing server 104.

Figure 2:
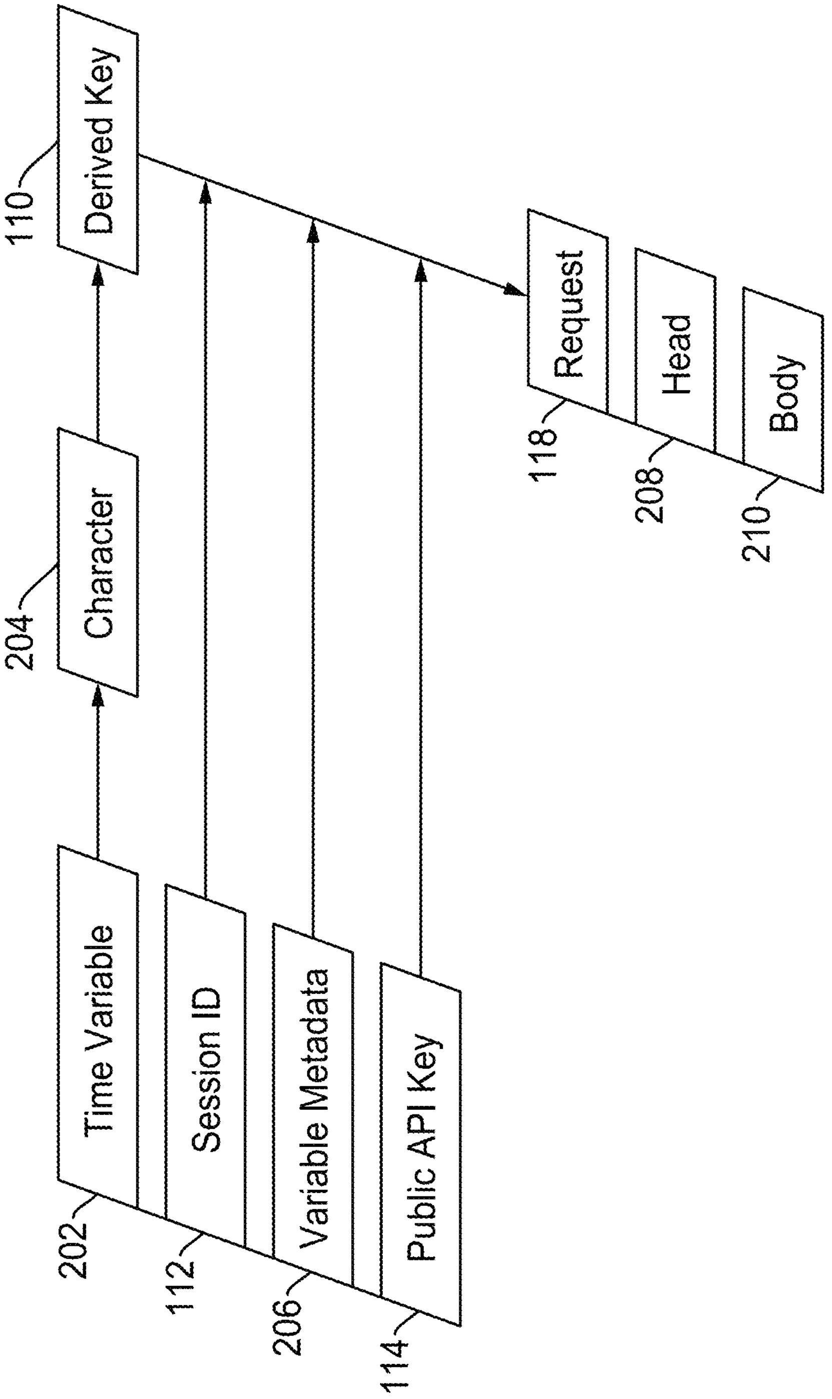
FIG. 2 illustrates a block diagram of the data flow within system according to the disclosed embodiments.

Operations are disclosed below with reference to FIG. 2, which depicts a block diagram of the data flow within system according to the disclosed embodiments. A request may be generated at client-side device 102. A time variable 202 is created and marked. Time variable 202 may be related a data as well as a time, such as a 24 hour clock down to milliseconds. For example, time variable 202 may be 2023101214020020, which corresponds to Oct. 12, 2023, 2:02 pm and 20 ms. This value may be determined by a clock at client-side device 102 and constantly changing. Further, the same value for time variable 202 should not be used twice.

Operation 121 executes by creating session id 112. Client-side device 102 may generate session id 112 as a random session-representing string. Session id 112 may be associated with request 118. Operation 122 executes by capturing variable metadata 206 for the requestor at client-side device 102. Variable metadata 206 may be a one or more features in combination, such as an IP address for client-side device 102, host, browser's user-agent, mailing address, zip code, project name, project code, and the like. Operation 124 executes by recalling pre-programmed public API key 114. Public API key 114 is disclosed in greater detail below. Operation 126 executes by creating derived key 110 based on time variable 202, also disclosed in greater detail below.

Client-side device 102 then may generate a new API transmission request 118 with head 208 and body 210. The information provided in request 118 will include items to generate encrypted validation object 117.

Head 208 will include a header based on derived key 110. Derived key 110 may use time variable 202 to identify a character strings within document 120 hosted at hosting server 106. For example, client-side device 102 may take the time using the data and time in milliseconds to generate time variable 202. In some operations, the digits of time variable are summed. Alternatively, the digits may be concatenated. The result may represent the length of the string to be captured for derived key 110. In some embodiments, the length of the string may be fixed, such as 8 characters.

The disclosed embodiments then take all the characters in document 120 on hosting server 106 makes them a character string 204. In some embodiments, document 120 is a text document, such as a book. In other embodiments, it may be a data file. Character string 204 may be thousands of characters. Accessing document 120, the disclosed embodiments retrieves the determined-length of characters from above, such as the summed value of time variable 202 or a fixed value set by client-side device 102, from character string 204. The characters for derived key 110 may start at the character in character string 204 corresponding to the value of time variable 202.

For example, if time variable 202 is 2024101214020020 as specified above, then the characters for derived key 110 start at the 2024101214020020$^{th}$ position within character string 204. If the value for time variable 202 exceeds the length of characters for character string 204, then the disclosed embodiments loop back around to the first character in document 120 and keeps going through the string. Derived key 110 is created as a subset of characters within document 120.

Next, variable metadata 206 is encrypted with derived key 110. The result is encrypted with session id 112. This result is encrypted with public API key 114. Public API key 114 may be a static non-password, non-private API key. If public API key 114 becomes known, then the integrity of using validation object 108 is not compromised. Public API key 114 may be stored at client-side device 102. Alternatively, client-side device 102 may retrieve public API key 114 from hosting server 106 or another trusted location within system 100.

The disclosed embodiments do not seek to eliminate API keys, but to remove the need for them to be handled like passwords. Inclusion of a non-private API key 114 is an expected layer to the disclosed process. Obfuscation is a tangential, but useful, step with regard to public API key 114 to add security through obscurity. Public API key 114 may be transformed using the obfuscation process. For example, on a user interface where public API key 114 is pre-programmed, it would be inputted normally and then translated into its obfuscated form and stored in this obfuscated form. Client device 102 can de-obfuscate the public API key 114 before enacting encryption process 116. The server would not need to use the obfuscation function as it could use the actual unencrypted public API key 114 as it is known constant for both the client device 102 and the trusted server 104.

Thus, public API key 114 is encrypted with the encrypted result of derived key 110, variable metadata 206, and session id 112 using encryption process 116. This result may be used in head 208 for request 118. This result also may be known as encrypted validation object 117, which is included in request 118.

The disclosed embodiments then include session id 112 in either head 208 or body 210. Time variable 202 also is in head 208 or body 210 along with variable metadata 206. Client-side device 102 then transmits request 118 to processing server 104. Processing server 104 also may be known as an authentication server, a carrier server, or a validator. Processing server 104 checks variable metadata 206 within head 208 and body 210 to determine if any of the information pertains to a user that should not have access. If so, then the disclosed embodiments pause processing for a period of time, such as 0.3 seconds, and then returns a notification that the request is unauthorized. This delay, known as the sleep period, prevents repeated attacks to processing server 104. This sleep period can be applied before processing starts, in-between processing steps, or after processing before access information is communicated back for request 118.

Processing server 104 checks to see if session id 112 is a known session id to determine if request 118 should be prevented. For example, if there are three expected points of contact with processing server 104 with session id 112 and the last point of contact was point of contact 3 and this request is point of contact 2, or if any of the points of contact are not in order, then processing server 104 returns a notification that request 118 is unauthorized, subject to the sleeping delay.

Processing server 104 then decrypts the encrypted validation object 117, or code within head 208 using public API key 114, which should be known by the processing server. The decryption result is further decrypted by session id 112. The disclosed process for generating derived key 110 is repeated with the provided time variable 202. Processing server 104 accesses document 120, or character string 204, stored at hosting server 106. The result is decrypted again with this result, which should match the characters to encrypt variable metadata 206 with derived key 110.

The result should be variable metadata 206. In operation 128, processing server 104 compares the decrypted metadata with variable metadata 206. If it matches then processing server 104 notifies client-side device 102 and system 100 that it has access to a private server. If the result does not match variable metadata 206, then processing server 104 returns a notification that access is not authorized, preferably subject to the sleep delay, such as 0.3 seconds.

In alternative embodiments, processing server 104 may encrypt the information for unencrypted validation object 108 provided with request 118 to determine if it matches encrypted validation object 117. In other words, processing server 104 would perform the same encryption operations as performed by client-side device 102. In these embodiments, processing server 104 would access character string 204 of document 120 to generate derived key 110, which is then used to encrypt the other parameters to achieve encrypted validation object 117. If the value match, then processing server 104 notifies system 100 that client-side device 102 is authorized to communicate with a private server. If not, then processing server 104 may send the unauthorized notification subject to the sleep delay.

Thus, the disclosed processes access a common document 120 in performing the encryption and authentication operations for client-side device 102. The processes implement time-based authentication. A time-based approach uses a static, trusted asset that also is potentially updating. Document 120 may be modified to prevent unauthorized access. By reading a known file, client-side device 102 and processing server 104 may create dynamic script that generates a random 5000 character string 204 based on a supplied time variable 202. By creating a time-based property and having that be a component of the encryption process plus allowing it to be repeatable, the disclosed embodiments receive the benefits of an already-setup time-based authenticator application without the drawbacks described below. The very first use of an authenticating communications may be secure, as opposed to conventional systems that are not necessarily secure.

The disclosed embodiments address two major security issues, the first being possible security issues with a potential loss of two-factor authentication by performing several actions and the second being problems with installing time-based authentication with one-time transmission requests. They delay each attempted connection by the sleep delay, thereby making automated attacks time-expensive. The disclosed embodiments ensure that variable metadata 206 is transmitted for standard security protocols. The disclosed embodiments also ensure that an algorithmic API key is used instead of a fixed API key. This feature ensures that the only way to actually hack system 100 is to steal and duplicate the algorithm. These features prevent any stored API requests, such as remembering that the encrypted layer at a particular time has a particular code, from infinitely valid. Instead, by basing the encryption on a static file that can change, the disclosed embodiments allow the actual encryption keys to change.

With one-time transmission requests, there are major implementation, security, and functionality challenges relating to time-based authentication applications. The most glaring issue is that the client device used for time-based authentication is not trusted. The disclosed embodiments remedy this trusted issue by replacing an untrusted client-controlled device with a trusted hosting server 106. The disclosed embodiments also allow request 116 to be secured without prompting the user-thereby allowing for secure, one-time requests to be made in the background. Without this, background requests would be easily identified as secure requests allowing for targeting as an exploitation vector. Implementation of time-based authentication apps for a one-time transmission requires more implementation work from the service provider and user. A time-based authentication application requires that the before a request is sent from a client device to a processing server, the user is prompted to both install the time-based authentication software and enact some compatibility protocol, such as entering a code or scan a QR code to allow access retrieval of a 2-factor authentication code to use. This may not be possible depending on implementation or malfunction and it may directly impact usability, especially for a one-time request.

The disclosed embodiments implement complex obfuscation. The disclosed embodiments also ensure the features are difficult to reverse engineer by separating the items into different encrypted components and then binding them together using encryption process 116. Using an API key in addition to an algorithm to ensure that there is no password-like component creates a misdirection as to what the credential system is. By leveraging several different compounding factors in the encryption process, it obfuscates the core logic of the algorithm. For example, the encryption algorithm will likely be defined in a broader scope than in context of this feature so it will likely be defined outside of this algorithm. This feature means a bad actor will need to traverse the codebase further and reverse engineer any compressed code or obfuscated code.

Figure 3:
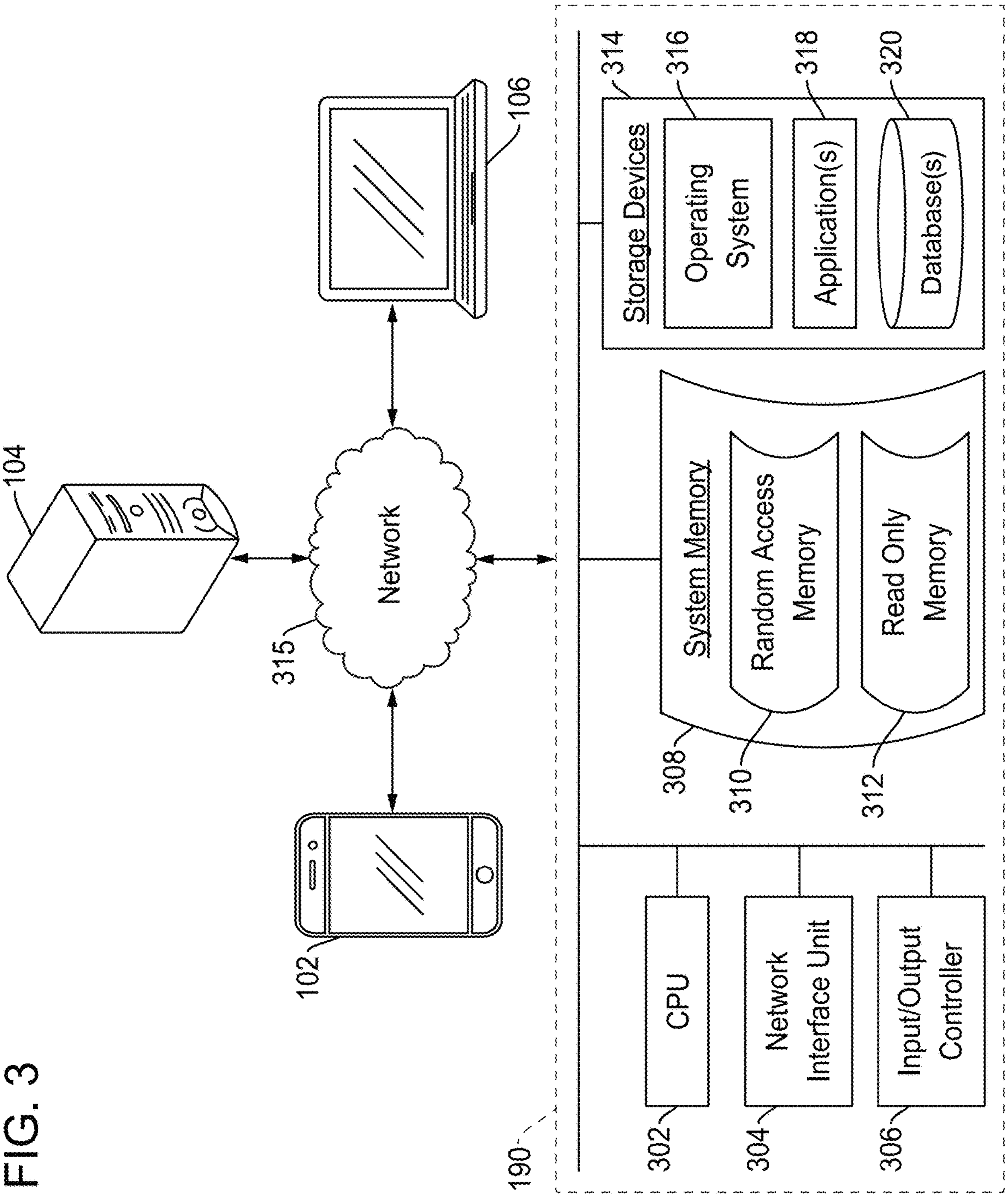
FIG. 3 illustrates a block diagram of an authentication management platform for implementing the disclosed processes according to the disclosed embodiments.

FIG. 3 depicts a block diagram of authentication management platform 190 for implementing the disclosed processes according to the disclosed embodiments. Platform 190 includes a network interface unit 304, an input/output controller 306, system memory 308, and one or more data storage devices 314. System memory 308 includes at least one read-only memory (ROM) 312 and random access memory (RAM) 310. All of these elements are in communication with central processing unit (CPU) 302 to facilitate the operation of platform 190.

Platform 190 may be a standalone computer, or, alternatively, the functions of platform 190 may be distributed across multiple computer systems and architectures. Platform 190 may be configured to perform some or all of the content processing, predictive model processing, business logic processing, and authentication management processing. These functions may be distributed across multiple devices within system 100. In some embodiments, platform 190 is connected via network 315 to other servers or systems within system 100. These other servers or systems includes client side device 102, processing server 104, and hosting server 106.

CPU 302 includes a processor, such as one or more microprocessors. CPU 302 also may include one or more supplementary co-processors such as math co-processors for offloading workload from CPU 302. CPU 302 is in communication with network interface unit 304 and input/output controller 306, through which CPU communicates with other devices such as other servers, user terminals, devices, and the like. Network interface unit 304 or input/output controller 306 may include multiple communication channels for simultaneous communication with other processors, servers, devices, and the like. Devices in communication with each other might not continually transmit to each other. For example, such devices need only transmit to each other as necessary.

CPU 302 also is in communication with data storage device 314. Data storage device 314 may include an appropriate combination of magnetic, optical, or semiconductor memory, and may include, for example, RAM, ROM, flash drive, an optical disc, and the like. CPU 302 and data storage device 314 each may be located within a single computer or other computing device or connected to each other by a communication medium, such as a USB port, a serial port cable, a coaxial cable, an Ethernet cable, a telephone line, a radio frequency transceiver or other similar wireless or wired medium or combination of the foregoing. For example, CPU 302 may be connected to data storage device 314 via network interface unit 304.

CPU 302 may be configured to perform one or more particular processing functions. For example, platform 190 may be configured as a content processor. The content processor retrieves external data from sources on the Internet, client side device 102, processing server 104, and hosting server 106. The content processor also accesses data sources and extracts data for predictive model processing. The content processor may extract and manipulate data from text, images, or other formats delivered through web formats and applications. Platform 190 also may be configured as a predictive model processor. The predictive model processor receives input from the content processor to determine one or more recommended results to manage authentication operations.

Data storage device 314 may store an operating system 316 for platform 190, one or more applications 318 (such as computer program code or a computer program product) adapted to direct CPU 302 in accordance with the disclosed embodiments. One or more databases 320 may be adapted to store information that may be utilized to store information required by platform 190. Operating system 316 or applications 318 may be stored in a compressed, an uncompiled, or an encrypted format, and may include computer program code. The instructions of the programs and applications may be read into a main memory of the processor from a computer-readable medium other than data storage device 314, such as from ROM 312 or RAM 310. While execution of sequences of instructions in the program causes CPU 302 to perform the processes disclosed herein, hardwired circuitry may be used in place of, or in combination with, software instructions for implementation of the disclosed processes.

Management platform 190 may be implemented as a stand-alone component within system 100. Alternatively, management platform 190 may be implemented in one of client side device 102, processing server 104, or hosting server 106. Authentication operations disclosed herein may be performing on any of the disclosed servers or platforms. One or more applications 318 may be executed within platform 190 to perform the functionality disclosed herein.

Figure 4:
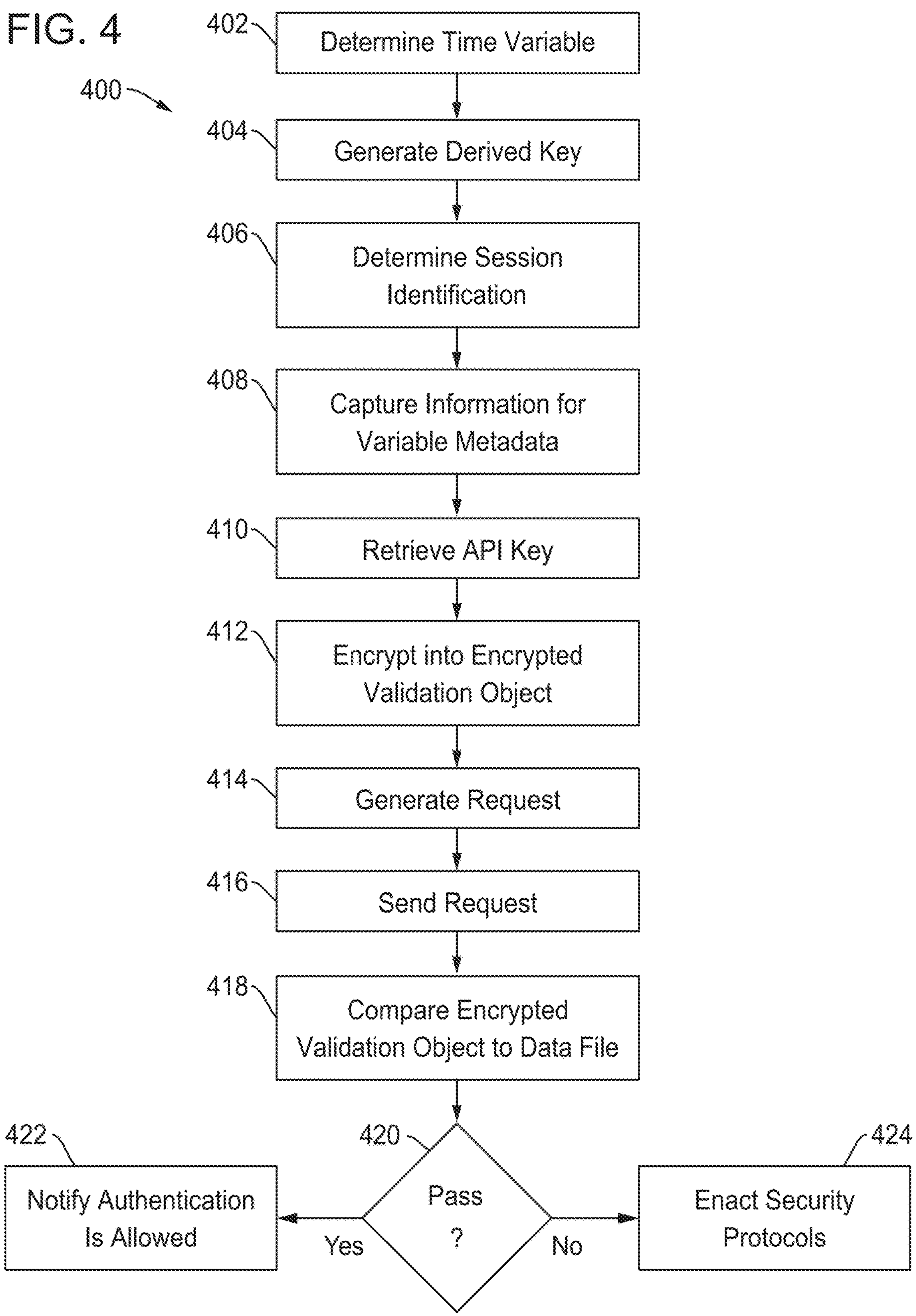
FIG. 4 illustrates a flowchart for authenticating a client-side device according to the disclosed embodiments.

FIG. 4 depicts a flowchart 400 for authenticating a client-side device 102 according to the disclosed embodiments. Flowchart 400 may refer to FIGS. 1-3 for illustrative purposes. Flowchart 400, however, is not limited to the embodiments disclosed in FIGS. 1-3.

Step 402 executes by determining a time variable 202 having a value. Step 404 executes by generating a derived key 110 from a data file at hosting server 106 using the value of time variable 202. Step 406 executes by determining a session identification 112. Client-side device 102 may generate session identification 112 as a random session-representing string. Step 408 executes by capturing information for variable metadata 206.

Step 410 executes by retrieving public API key 114. Step 412 executes by encrypting derived key 110, session identification 112, variable metadata 206, and public API key 114 into encrypted validation object 117. The information used in the encryption may come from unencrypted validation object 108. Step 414 executes by generating request 118 for authentication onto a private network having encrypted validation object 117. Step 416 executes by sending request 118 to processing server 104.

Step 418 executes by comparing encrypted validation object 117 to the data file at hosting server 106. The data file may be document 120. A process may be performed at processing server 104. Step 420 executes by determining whether the comparison passes authentication. If yes, then step 422 executes by notifying that authentication is allowed. If step 420 is no, then step 424 executes by enacting security protocols to hinder automated attacks and to deny authentication.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the “C” programming language or similar programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms “a,” “an” and “the” are intended to include plural forms as well, unless the context clearly indicates otherwise. It will be further understood that the terms “comprises” or “comprising,” when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed embodiments may be made without departing from the spirit or scope of the invention. Thus, it is intended that the present invention covers the modifications and variations disclosed above provided that these changes come within the scope of the claims and their equivalents.

The invention claimed is:

1. A method for authenticating a client-side device to access a private network, the method comprising:

determining a time variable having a value;

generating a derived key from a data file at a hosting server using the value of the time variable;

determining a session identification;

capturing information for variable metadata;

retrieving an application programming interface (API) key;

encrypting the derived key, the session identification, the variable metadata, and the API key into an encrypted validation object;

generating a request for authentication onto the private network having the encrypted validation object;

sending the request to a processing server;

comparing the encrypted validation object to the data file at the hosting server; and determining whether authentication is allowed based on the comparison.

2. The method of claim 1, wherein the API key is a public API key.

3. The method of claim 1, wherein the variable metadata includes at least one of an IP address, mailing address, zip code, name, code, and location.

4. The method of claim 1, wherein comparing the encrypted validation object includes performing a process at the processing server to execute the comparison.

5. The method of claim 1, wherein determining whether the authentication is allowed includes notifying the client-side device that the authentication is allowed based on the comparison.

6. The method of claim 1, wherein determining whether the authentication is allowed includes enacting a security protocol when the authentication is not allowed based on the comparison.

7. The method of claim 1, wherein the data file is a document.

8. A method for authenticating a client-side device to submit data, the method comprising:

generating a derived key from a data file at a hosting server using a time variable;

determining a session identification;

capturing information for variable metadata;

retrieving a public application programming interface (API) key;

encrypting the derived key, the session identification, the variable metadata, and the public API key into an encrypted validation object;

generating a request for authentication onto the private network having the encrypted validation object;

sending the request to a processing server; and determining whether authentication is allowed based on the request.

9. The method of claim 8, further comprising comparing the encrypted validation object to the data file at the hosting server.

10. The method of claim 9, wherein comparing the encrypted validation object includes performing a processing at the processing server to perform the comparison.

11. The method of claim 9, further comprising notifying whether the authentication is allowed based on the comparison.

12. The method of claim 8, further comprising determining the time variable having a value.

13. The method of claim 12, further comprising using the value of the time variable to generate the derived key.

14. A method for authenticating a client-side device, the method comprising:

encrypting a derived key, a session identification, variable metadata, and an application programming interface (API) key into an encrypted validation object;

sending a request for authentication onto a private network having the encrypted validation object to a processing server;

determining whether authentication onto the private network is allowed based on the request.

15. The method of claim 14, further comprising generating the derived key from a data file at a hosting server using a value of a time variable.

16. The method of claim 15, further comprising determining the value of the time variable.

17. The method of claim 14, further comprising determining the session identification.

18. The method of claim 14, further comprising capturing information for the variable metadata.

19. The method of claim 14, further comprising retrieving the API key.

20. The method of claim 14, further comprising generating the request for authentication having the encrypted validation object.

* * * * *